United States Patent Office 3,386,833
Patented June 4, 1968

3,386,833
SIMULATED MILK COMPRISING SOY BEAN FLOUR, SESAME SEED FLOUR AND COCONUT MEAL
George W. Johnson, 18841 Via Sereno, Yorba Linda, Calif. 92686
No Drawing. Filed June 14, 1965, Ser. No. 463,931
6 Claims. (Cl. 99—64)

This invention relates to a simulated milk and more particularly provides an improved product, either in liquid form or in a powdered form, to which water may be added, for use by infants as a substitute for human milk and by adults who may be allergic to cow's milk.

Because of allergies, many individuals cannot include cow's milk in their diets and frequently their physicians will direct them to use soy bean milk which is presently the only acceptable substitute. Soy bean milk is usually prepared from soy beans which have been finely ground to provide a powder which is dispersible in water. The substitute soy bean milk conventionally marketed has a dark unattractive appearance and is vastly different in flavor from cow's milk and is often found unpalatable by those accustomed to cow's milk. Conventional soy bean milk is nutritionally less acceptable than cow's milk in several ways. Soy bean milk contains only approximately half of the essential amino acid, methionine, which is found in a like quantity of cow's milk. Soy beans contain a toxic factor which is antithyroid in activity and an enzyme which interferes with protein digestion. This toxic factor and objectionable enzyme are conventionally destroyed by light roasting of the soy bean but unfortunately the detoxification procedure also destroys beneficial enzymes of the soy bean including the highly valuable phosphatase enzyme. Other nutritional materials are to some extent damaged and lessened in value by the toasting procedure. Soy bean milk contains less than one-fourth of the calcium content of milk, which shortcoming is especially undesirable for a growing child. Soy bean powder now employed for making of simulated milk is inherently inadequate in antioxidant properties and deteriorates in the presence of air.

It is a principal object of the invention to provide a simulated cow's milk which has an improved appearance and is more nutritious and palatable than the soy bean milk substitute heretofore employed.

It is a still further object of the invention to provide a simulated milk acceptable for infant consumption which more closely approaches the protein content of human milk than is characteristic of cow's milk or soy bean milk.

It is another object of the invention to provide a simulated cow's milk having a higher methionine content than is present in presently available soy bean milk.

It is a further object of the invention to provide a simulated milk having an enriched iron content superior to that of cow's milk.

It is a still further object of the invention to provide a simulated milk of vegetable origin characterized by minimum enzyme destruction in the preparation of the powdered mixture used for the formation of the milk.

It is a still further object of the invention to provide a simulated milk of vegetable origin that has a significantly higher calcium content than the heretofore commonly used soy bean milk.

It is another object of the invention to provide a simulated milk having a significantly less saturated fat content than is characteristic of cow's milk.

It is another object of the invention to provide a soy bean-containing simulated milk powder having a naturally occurring antioxidant material.

Soy bean flour made from the whole ground seed has been used heretofore in the preparation of milk substitutes. Soy bean milk, while being the most widely used of the milk substitutes, has a flavor which is unpalatable to most people and as a result the substitute milk is generally used only in the more extreme allergy conditions. The substitute milk composition of the invention has a highly acceptable flavor is nutritionally superior to soy milk in several ways, and generally more closely resembles cow's milk than substitutes heretofore available.

The composition of the invention comprises three principal ingredients: soy bean flour, sesame seed flour, and coconut meal. The three components are ground to extremely fine powder with the soy bean being provided preferably in four parts by weight to three parts by weight of the sesame seed and two parts by weight of the coconut meal. Somewhat varying amounts of the three components may be employed in the composition; generally, the soy bean flour should be present in an amount within the range of 2 to 6 parts by weight, the sesame seed flour in an amount within the range of 2 to 6 parts by weight, and the coconut meal in an amount within the range of 1 to 2 parts by weight. The soy and sesame seed flour are best employed for a superior milk respectively in the range of 3 to 5 parts by weight per 1 to 2 parts by weight of the coconut meal. The coconut meal is prepared from dried coconut meat (copra). Copra typically contains 2 to 5% water by weight.

A small amount of lecithin, usually in the range of 0.5 to 2% by weight of the three principal ingredients, is desirably incorporated as a water dispersing agent for the three ingredients.

The powdered mixture may be placed in liquid suspension by stirring in water, preferably employing a Waring-type blender. The product will remain in suspension for a long period of time without the aid of an emulsifying or suspending agent. However, a superior product is had by incorporating a small stabilizing amount of an edible emulsifying agent such as extracts of Irish moss, (*Chondrus crispus*) or other edible alginate base material.

It will be appreciated that the composition of the invention may be enriched by incorporating vitamins or other desired ingredients.

In the preparation of the liquid simulated milk of the invention, 6 to 9 teaspoons (approximately 4.9 ml. per teaspoon) of the powdered composition are added to one quart of water and thoroughly mixed in a blender. The precise amount of powdered composition employed may be varied somewhat to suit the taste of the user.

In the plant manufacture of the composition of the invention it is advantageous to first mix the finely ground powder composition with water to make the simulated cow's milk and then spray-dry to obtain a product which may be placed by the consumer more readily into a liquid form.

Cow's milk and conventional soy bean milk have high protein contents of about 3.4% compared with human breast milk of about 1.4% protein. This higher protein content of cow's and soy bean milks is frequently not acceptable to infants and it becomes necessary to dilute the milk where it is being substituted for human milk and there is thus a resultant lowering of other desirable nutritional values. The simulated milk of the invention contains a significantly less protein content of approximately 1.5% which more nearly approximates that of human milk than either cow's milk or soy bean milk. The lower protein content is attributable to the significantly less protein found in sesame seed flour and coconut meal than in undiluted soy bean flour.

A principal shortcoming of soy bean milk apart from its relative unpalatability has been its relatively low methionine (an essential sulphur amino acid) content, being approximately 60% that of cow's milk. If it should be that the diet of an individual is deficient in betaine and choline, the principal sources of the methyl groups needed by normal metabolism of the body, methionine is called on to supply the needed methyl groups, thus leading to a further deficiency of this essential sulphur amino acid. The simulated milk composition of the invention has a high methionine content, considerably more than that of conventional soy bean milk. Sesame seed flour contains over twice the amount of methionine found in soy bean flour. Cow's milk is deficient in iron. The product of the invention has approximately six times as much iron as found in cow's milk.

Soy bean milk heretofore employed as a cow's milk substitute is produced from a raw material which is necessarily toasted to eliminate the toxic factor characteristic of soy beans. The simulated milk composition of the invention includes as principal ingredients the raw and untreated sesame seed flour and coconut meal which contain their full natural enzyme complement and other valuable nutritional elements undamaged.

A principal objection to the use of soy bean milk as a substitute for cow's milk is its exceedingly low calcium content. Soy bean milk characteristically contains approximately one-fifth of the calcium found in cow's milk. The simulated milk composition of the invention contains significantly more calcium than is found in conventional soy bean milk. Sesame seeds contain approximately six times as much calcium as is characteristic of soy beans. Because of this the composition of the invention contains a much higher calcium content than that of conventional soy milk.

The fat of cow's milk is predominantly saturated and this is objectionable for the consumer who is on a low cholesterol diet. The simulated milk composition of the invention is made of vegetable materials having their fats principally in the unsaturated form.

The simulated milk composition of the invention contains a relatively high proportion of the two important amino acids, namely, lycine and methionine, which have been demonstrated as being capable of initiating full growth in cases of severe malnutrition. Soy beans, sesame seed, and coconut all contain high amounts of both lycine and methionine and this makes the product of the invention especially attractive for use in countries having low protein resources.

Soy bean flour commonly used heretofore in the production of a simulated cow's milk has an objectionably short keeping quality, primarily because of the absence of a suitable antioxidant material to protect the unsaturated fats of the soy bean against oxidation. It has been found that sesame seed fluor intimately mixed with the soy bean fluor and coconut meal protects the latter two materials effectively for long periods of time against oxidation. An unrefrigerated and unsealed powder composition of the invention at the end of eight months, when added to water and blended therewith, showed but slight change in flavor. A soy bean composition containing no sesame seed under similar handling was rancid.

Although exemplary embodiments of the invention have been disclosed herein for purposes of illustration, it will be understood that various changes, modifications, and substitutions may be incorporated in such embodiments without departing from the spirit of the invention as defined by the claims which follow.

I claim:

1. A substitute milk powder comprising soy bean flour, sesame seed flour, and coconut meal, said soy bean flour being present in an amount within the range of 2 to 6 parts by weight, the sesame seed flour in an amount within the range of 2 to 6 parts by weight, and the coconut meal in an amount within the range of 1 to 2 parts by weight.

2. A substitute milk powder comprising soy bean flour, sesame seed flour, and coconut meal, said soy bean flour being present in an amount within the range of 3 to 5 parts by weight, the sesame seed flour in an amount within the range of 3 to 5 parts by weight, and the coconut meal in an amount within the range of 1 to 2 parts by weight, and an edible emulsifying agent present in an amount sufficient to stabilize the suspension of the flour and meal in water.

3. A substitute milk powder according to claim 2 wherein the emulsifying agent is an extract of Irish moss.

4. A substitute milk comprising an aqueous suspension of a powder mixture of soy bean flour, sesame seed flour, and coconut meal, said mixture containing the soy bean flour in an amount within the range of 2 to 6 parts by weight, the sesame seed flour in an amount within the range of 2 to 6 parts by weight, and the coconut meal in an amount within the range of 1 to 2 parts by weight, said powder mixture being provided in an amount within the range of 6 to 9 teaspoons per quart of water.

5. A substitute milk in accordance with claim 4 wherein there is provided a small amount of an edible emulsifying agent present in an amount sufficient to stabilize the suspension of the powder mixture in water.

6. A substitute milk in accordance with claim 5 wherein the edible emulsifying agent is an alginate material.

References Cited

FOREIGN PATENTS 27,860    1912    Great Britain.

S. E. HEYMAN, *Assistant Examiner.*

RAYMOND N. JONES, *Primary Examiner.*